United States Patent
Thorpe et al.

(10) Patent No.: US 7,353,306 B2
(45) Date of Patent: *Apr. 1, 2008

(54) STORAGE CONTROLLER REDUNDANCY USING BI-DIRECTIONAL REFLECTIVE MEMORY CHANNEL

(75) Inventors: Roger T. Thorpe, Irvine, CA (US); Erasmo Brenes, Irvine, CA (US); Stephen O'Neil, Coronoa, CA (US); Alec Shen, Irvine, CA (US)

(73) Assignee: iStor Networks, Inc., Irvine, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/119,213

(22) Filed: Apr. 29, 2005

(65) Prior Publication Data
US 2005/0210317 A1    Sep. 22, 2005

Related U.S. Application Data

(62) Division of application No. 10/370,042, filed on Feb. 19, 2003, now Pat. No. 6,941,396.

(51) Int. Cl.
*G06F 13/12* (2006.01)
*G06F 13/00* (2006.01)
*H04B 1/74* (2006.01)
*H04L 1/22* (2006.01)

(52) U.S. Cl. .................. 710/74; 710/62; 710/64; 710/72; 714/1; 714/2; 714/6; 714/7; 714/42; 707/202; 707/204; 711/100; 711/161; 711/162; 709/200; 709/201; 709/213; 709/216; 709/217; 709/218

(58) Field of Classification Search ............... 710/5, 710/20, 21, 31, 52, 62, 64, 72, 74; 709/200, 709/201, 213–218; 711/100, 113, 114, 161, 711/162; 707/202, 204; 714/1, 2, 5, 67, 714/42
See application file for complete search history.

(56) References Cited

U.S. PATENT DOCUMENTS

| 4,984,240 A | * | 1/1991 | Keren-Zvi et al. ............. 714/4 |
| 5,146,607 A | | 9/1992 | Sood et al. |
| 5,546,535 A | | 8/1996 | Stallmo et al. |
| 5,761,705 A | | 6/1998 | DeKoning et al. |
| 5,928,367 A | | 7/1999 | Nelson et al. |
| 5,987,496 A | | 11/1999 | Shen et al. |

(Continued)

*Primary Examiner*—Tanh Q Nguyen
(74) *Attorney, Agent, or Firm*—Knobbe, Martens, Olson & Bear, LLP

(57) ABSTRACT

A bi-directional reflective memory channel between a pair of storage controllers is used to maintain a mirrored copy of each storage controller's native buffer contents within the buffer of the other storage controller. To maintain such mirrored copies, buffer write operations that fall within a reflective memory segment of one storage controller are automatically reflected across this channel to the other storage controller for execution, and vice versa. The write operations are preferably transmitted across the reflective memory channel using a protocol that provides for error checking, acknowledgements, and retransmissions. This protocol is preferably implemented entirely in automated circuitry, so that the mirrored copies are maintained without any CPU intervention during error-free operation. When a failover occurs, the surviving storage controller uses the mirrored copy of the failed storage controller's native buffer contents to assume control over the failed storage controller's disk drives.

8 Claims, 8 Drawing Sheets

U.S. PATENT DOCUMENTS 6,289,471 B1    9/2001  Gordon
6,295,585 B1    9/2001  Gillett et al.
6,941,396 B1 *  9/2005  Thorpe et al. ................ 710/74
2003/0101228 A1    5/2003  Busser et al.
2004/0117580 A1    6/2004  Wu et al.

* cited by examiner

STORAGE CONTROLLER REDUNDANCY USING BI-DIRECTIONAL REFLECTIVE MEMORY CHANNEL

RELATED APPLICATIONS

This application is a division of U.S. application Ser. No. 10/370,042, filed Feb. 19, 2003, now U.S. Pat. No. 6,941,396, the disclosure of which is hereby incorporated by reference.

FIELD OF THE INVENTION

The present invention relates to network-based storage systems, and more particularly, to techniques for providing storage controller redundancy within a network-based storage system.

BACKGROUND OF THE INVENTION

A variety of network-attached and SAN (Storage Area Network) based storage systems exist for allowing data to be stored on an Ethernet or other IP based network. Typically, these systems include one or more storage controllers, each of which controls and provides network-based access to a respective array of disk drives. Each storage controller typically includes a buffer or cache memory that is used to temporarily store data as it is transferred between the network and that controller's disk drives. For example, incoming data packets containing I/O (input/output) write data may be maintained in a buffer of the storage controller until successfully written to the appropriate disk drives.

Some storage systems implement a storage controller failover mechanism to protect against the possible failure of a storage controller. For example, in some systems, two storage controllers may be paired for purposes of providing controller redundancy. When one of these paired storage controllers detects a failure by the other, the non-failing storage controller may take control of the failing controller's disk drives, allowing these disk drives to be accessed via the network while the failing storage controller is replaced.

To provide such redundancy, one storage controller may maintain or have access to a mirrored copy of the other storage controller's cache and configuration data. This allows the non-failing storage controller to effectively pick up the workload of the failing controller where the failing controller left off. Upon replacement of the failing controller, a synchronization or "rebind" operation may be performed between the non-failing and new storage controllers to copy over the cache and configuration data needed to bring the new storage controller on line.

One significant problem with existing storage system designs is that the mechanism used to provide storage controller redundancy typically adversely affects or limits the performance of the storage system. For example, in some designs, the mechanism used to maintain a redundant copy of a storage controller's cache data limits the rate at which the storage controller can process network traffic and perform input/output operations. In one such design, described in U.S. Pat. No. 5,928,367, the respective memories of two separate controllers are updated synchronously (in lock step); as a result, if a write operation to one of these memories cannot immediately be performed, the corresponding write operation to the other memory generally must also be postponed.

In addition, in many designs, some or all of the system's disk drives cannot be accessed while a rebind operation is being performed between the non-failing and new storage controllers. The present invention seeks to address these and other limitations in existing designs.

SUMMARY OF THE INVENTION

The present invention makes use of a bi-directional reflective memory channel between a pair of storage controllers to allow each such storage controller to maintain a mirrored copy of the other's buffer contents in real time. To maintain such mirrored copies, buffer write operations that fall within a reflective memory segment of one storage controller are automatically reflected across this channel to the other storage controller for execution, and vice versa. The corresponding write operations are executed asynchronously by the two controllers, such that the postponement of one write operation does not require postponement of the other.

The write operations are preferably transmitted across the reflective memory channel and processed according to an asynchronous reflective memory protocol that provides for error checking, acknowledgements, and retransmissions. This protocol is preferably implemented entirely in automated circuitry, so that the mirrored copies are maintained without any CPU (central processing unit) intervention during error-free operation. When a failover occurs, the surviving storage controller uses the mirrored copy of the failed storage controller's native buffer contents to assume control over, and provide network-based access to, the failed storage controller's disk drives. Failover arbitration and control messages are preferably passed between the two controllers over a channel that is separate from the reflective memory channel, so that these messages do not interfere with reflective memory operations.

In a preferred embodiment, each storage controller is capable of receiving packet data from a local area network, and storing such data in its local buffer, at a rate of 10 gigabits per second. To support this transfer rate, two 10-gigabit reflective memory channels are provided between the two storage controllers—one for carrying data in each direction.

To implement the reflective memory system, each storage controller preferably includes an automated reflective memory controller (RMC) that monitors write operations to that storage controller's buffer. Write operations falling within the local storage controller's reflective memory segment are packetized by the local RMC for transmission to the remote RMC. The remote RMC executes each reflected write operation by writing the associated block of write data to the same destination address as specified within the original write operation. As mentioned above, the original and reflected write operations are executed asynchronously, meaning that one may be completed by its respective RMC before the other.

Packet transfers between the RMCs occur over the reflective memory channel according to the asynchronous reflective memory protocol which, as mentioned above, is preferably implemented entirely within automated circuitry. The packets are sufficiently small in the preferred embodiment to allow rapid generation of packet CRC values. The rapid generation of CRC values, and the low overhead of the protocol, allow the reflected data to be transferred with very low latency. Data packets transmitted across the reflective memory channel are preferably error checked and acknowledged by the receiving RMC. If the receiving RMC returns a negative acknowledgement or fails to return an acknowledgement, the sending RMC preferably retries the packet transmission.

Each RMC also preferably supports a "rebind" mode in which buffer read operations are reflected across the channel. The rebind mode allows a mirrored copy of a failed storage controller's buffer data to be copied from a surviving storage controller to a replacement storage controller without the need to write data to the buffer of the surviving storage controller. Because this data need not be read from and then written back to the surviving controller's buffer (as would be the case if only write operations were reflected), the surviving controller can continue to process ordinary write operations without risk of mirroring overwritten data (i.e., buffer coherency is not a concern). As a result, during such rebind processing, the surviving storage controller can continue to provide network-based access to its own disk drives and to those of the failed storage controller.

In one embodiment, each RMC includes multiple first-in-first-out buffers (FIFOs) that are used to accumulate data to be transmitted across the reflective memory channel. The RMC circuitry that selects between these transmission FIFOs gives priority to at least one of these FIFOs over the other(s), allowing different transmission priority levels to be given to different types of reflected data. One of the transmission FIFOs is also preferably dedicated to "fast path traffic," which is packet data that is received from the network and written to the buffer without any CPU intervention. The fast path traffic is preferably processed as it is received by a hardware-implemented protocol engine that automates selected portions of the iSCSI and TCP/IP protocols.

BRIEF DESCRIPTION OF THE DRAWINGS

A particular embodiment of the invention will now be described with reference to the following drawings.

DETAILED DESCRIPTION OF THE PREFERRED EMBODIMENTS

A storage system that uses a hardware-implemented, bi-directional reflective memory channel to provide storage controller redundancy will now be described in detail. Throughout the description, reference will be made to numerous implementation details, including but not limited to specific data transfer rates, networking and storage standards, network port configurations, packet formats, protocols, and buffer configurations. These implementation details are provided in order to fully illustrate one particular embodiment of the invention, and not to limit the scope of the invention. The invention is defined only by the appended claims.

I. Table of Abbreviations

The following abbreviations and acronyms will be used throughout the detailed description of the preferred embodiment:

ACK/NAK: Acknowledgement and Negative Acknowledgement, respectively.
BMI: Buffer Memory Interface
CLH—Cache Line Header
CPU—Central Processing Unit
FIFO—First-in-first-out (buffer)
GE (as in "1 GE" or "10 GE")—Gigabit Ethernet
I/F—Interface
LAN—Local Area Network
MPU—Management Processing Unit
PIE—Protocol Intercept Engine
RMC—Reflective Memory Controller
RX—Receive
TX—Transmit II. Overview (FIGS. 1 and 2)

Figure 1:
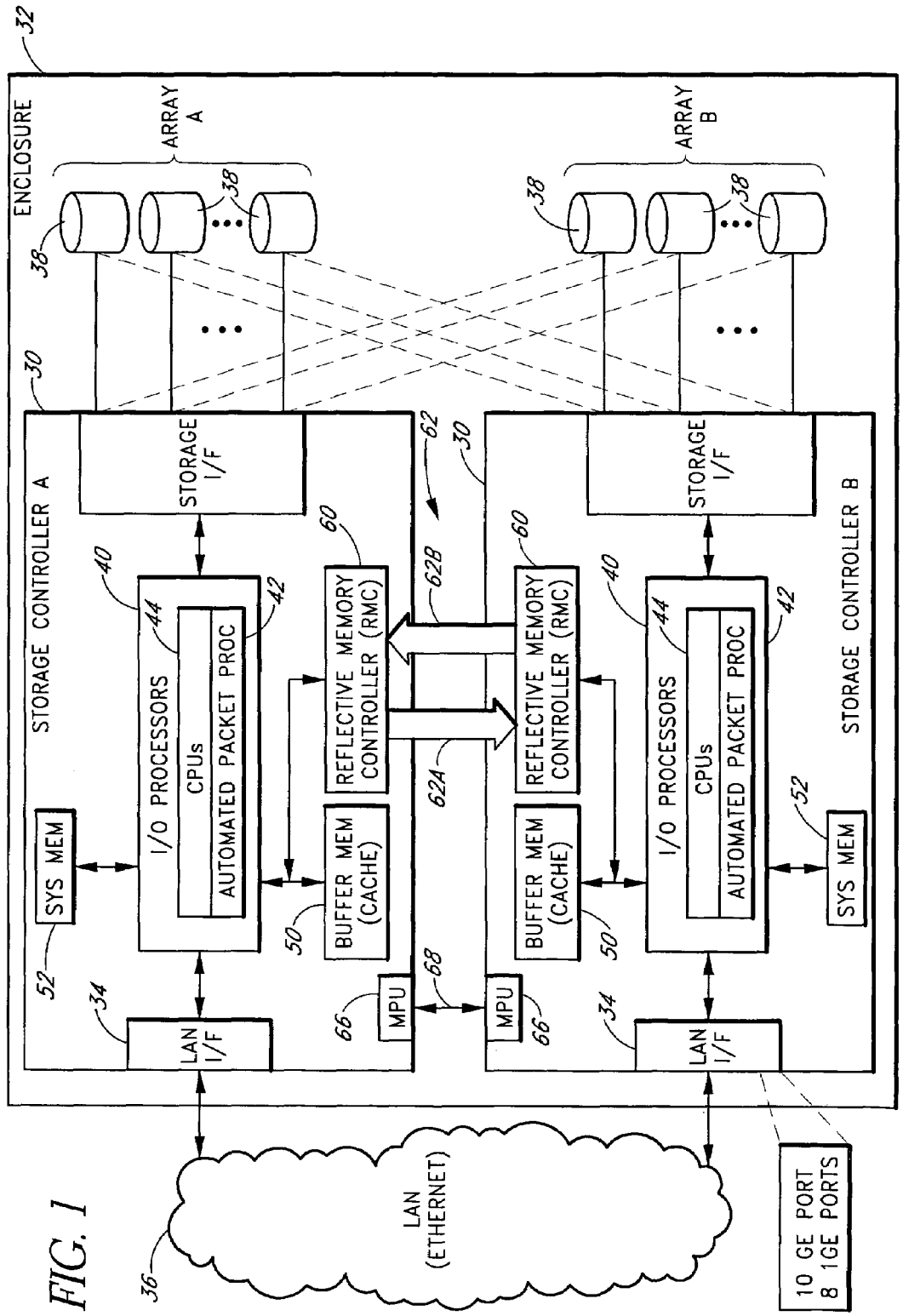
FIG. 1 illustrates a storage system that includes a pair of storage controllers arranged as peers in a redundant configuration.
Figure 2:
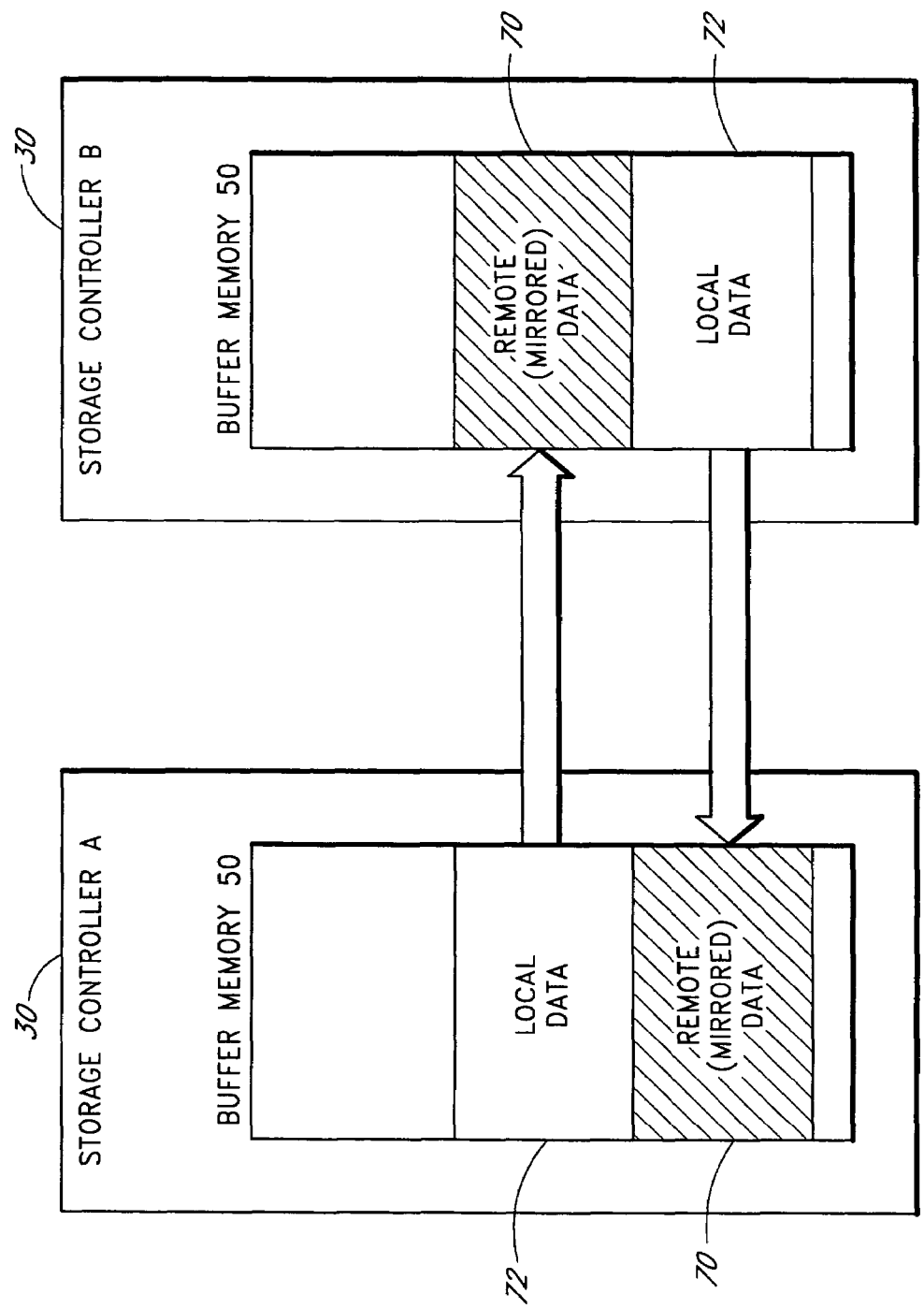
FIG. 2 illustrates how native and reflected buffer data is stored in the respective buffer memories of the storage controllers of FIG. 1.

FIG. 1 illustrates a storage system that includes a pair of storage controllers 30 arranged as peers in a redundant configuration. Each storage controller may, for example, be in the form of a card or board that plugs into a backplane of a larger storage system. As described in detail below, the storage controllers 30 implement a bi-directional reflective memory channel and an associated protocol that allow each storage controller to maintain a real time copy of the other's native buffer and configuration data.

The storage controllers 30, designated by reference characters A and B, are depicted as being housed within a common storage box or enclosure 32, but may alternatively reside in separate enclosures. Each storage controller is connected by a respective network interface (I/F) 34 to a common LAN (local area network) 36, such as an Ethernet based LAN. Client computers (not shown) access the storage controllers 30 over the network 36, preferable but not necessarily using the iSCSI protocol, in order to store and retrieve data on arrays of disk drives 38 controlled by the storage controllers 30. Although a single LAN is shown, each storage controller 30 may connect to multiple, distinct LANs.

In the particular embodiment described herein, each LAN interface 34 includes one ten-gigabit Ethernet (10 GE) port and eight one-gigabit Ethernet (1 GE) ports, as depicted in FIG. 1 for one of the two storage controllers. In this embodiment, each storage controller can be configured to operate in one of two modes: a 1 GE mode in which the storage controller connects to the LAN 36 (or multiple LANs) via any number of the eight 1-GE ports (but not the 10-GE port); and a 10 GE mode in which the storage controller connects to the LAN via the 10 GE port only. As will be apparent, many of the implementation details of the bidirectional reflective memory channel are dependent upon this particular LAN interface design, and will thus naturally vary in embodiments that use other LAN interfaces and port configuration options.

As depicted in FIG. 1, each storage controller 30 is assigned to or "owns" a respective set or array of disk drives 38 or other storage devices. Specifically, storage controller A owns the disk drives 38 of array A, and storage controller B owns the disk drives of array B. The disk drives 38 are shown as residing within the enclosure 32, but may alternatively reside outside the enclosure. The disk drives may, for example, be serial ATA (Advanced Technology Attachment) disk drives, although SCSI, non-serial ATA, and other types of disk drives may be used. Other types of storage devices may be used in place of some or all of the disk drives, including but not limited to optical drives and solid state storage devices. Each storage controller 30 operates generally as a disk array controller, and may operate its respective disk array as a RAID (Redundant Array of Inexpensive Disks) array, JBOD (Just a Bunch of Disks) array, or other configuration.

During normal, redundant operation (no failover events), each storage controller 30 exclusively controls the disk drives 38 it owns. As depicted by dashed lines in FIG. 1, each storage controller is also physically connected to, and is capable of assuming control of, the other storage controller's disk drives 38. For example, if storage controller A detects a failure by storage controller B, storage controller A may initiate a failover process in which storage controller B is taken off line, and in which storage controller A assumes control of the disk drives owned by storage controller B. A selector switch (not shown), such as a conventional drive connector multiplexer, may be connected to each disk drive 38 to enable such transfers of control. Following the transfer of control, storage controller A provides network-based access to both arrays of drives, A and B, allowing storage controller B to be replaced. As described in detail below, this failover process makes use of redundant or mirrored copies of buffer data maintained via the reflective memory channel.

The two storage controllers 30 are preferably identical in design, and operate as peers to each other. Each storage controller includes a set of I/O (input/output) processors 40 that process incoming packets received from the network 36, and which generate and transmit response packets on the network. As illustrated, the I/O processors 40 of each storage controller preferably include an automated packet processor 42 and a set of central processing units (CPUs) 44. Each automated packet processor 42 preferably includes application-specific circuitry that automates selected portions of the TCP/IP and iSCSI protocols, as is desirable for providing a high level of performance (e.g. transfer rates of 10 gigabits/sec or higher per storage controller). The CPUs execute firmware modules for performing various storage related tasks, some of which relate specifically to the reflective memory channel and failover events. As discussed below, the CPUs also perform "slow path" processing on selected packets.

As further shown in FIG. 1, each storage controller 30 includes a buffer memory 50, referred to herein as a "buffer." The buffers 50 are used to store incoming packet data received from the network, and to accumulate incoming and outgoing I/O data. The incoming packet data stored in the buffers 50 consists primarily of packet payloads containing I/O write data.

In one embodiment, each buffer 50 is capable of receiving and storing incoming packet data from the network at a rate of ten gigabits per second (Gb/s), which corresponds to the ten Gb/s maximum transfer rate supported by each LAN interface 34. The buffers 50 are preferably implemented as random access memory (RAM), such as SDRAM (synchronous dynamic RAM). Each buffer 50 is managed by software executed by the respective controller's CPUs to provide a storage cache. The cache management software stores data in the buffer 50 in cache lines.

With further reference to FIG. 1, each storage controller 30 further includes a system memory 52 that stores code modules executed by the associated CPUs. As with the buffers 50, the system memories 52 may be implemented using SDRAM.

The system memories 52 also store various types of configuration and state information. This information preferably includes buffer metadata descriptive of the data currently stored in the respective storage controller's buffer 50. In one implementation, the buffer metadata is in the form of cache line headers (CLHs) descriptive of the buffer data stored within each cache line of the software-implemented storage cache. As described below, this metadata may periodically be copied from the system memory 52 to the corresponding buffer 50 to allow each storage controller to maintain a redundant copy of its peer's buffer metadata.

To support failover operations, each storage controller maintains, within its respective buffer, a complete copy of the native buffer data of the other storage controller. This allows a non-failing storage controller to rapidly pick up the workload of a failing storage controller where the failing storage controller left off. The task of maintaining the redundant copies of buffer data is the primary responsibility of the reflective memory controllers (RMCs) 60 shown in FIG. 1, which communicate over a pair of like communication channels 62A, 62B. The two unidirectional channels 62A, B, collectively form a bidirectional reflective memory channel 62. This bi-directional channel 62 is preferably dedicated to transfers of reflected buffer data. As discussed below, all other types of inter-controller communications preferably occur over a separate channel and associated medium.

Any appropriate interface and medium may be used to implement the bi-directional reflective memory channel 62. In the preferred embodiment, the RMCs 60 communicate over each channel 62A, 62B according to XGMII (10-Gigabit Medium Independent Interface), and can thus communicate at a rate of ten gigabits per second in each direction. The XGMII signals generated by the RMC's are converted to XAUI (10-gigabit Attachment Unit Interface) signals for transmission over a backplane that interconnects the two storage controllers 30. The conversions between the XGMII and XAUI interfaces are performed by commercially-available devices mounted on the respective boards of the storage controllers 30, externally to the respective ASICs (Application Specific Integrated Circuits) in which the RMCs reside. At the receiving end, the XAUI signals are converted back to XGMII for delivery to the receiving ASIC/RMC. As will be recognized, the bi-directional reflective memory channel 62 can alternatively be implemented using other interfaces, and can be implemented using an alternative medium such as a cable or (in future implementations) a wireless link.

As described in detail below, the protocol used to transfer buffer data over the bi-directional channel 62 is preferably implemented entirely in hardware, allowing the reflected data to be transferred at high bit rates and with low latency. The protocol is referred to herein as an "asynchronous reflective memory protocol," as it allows the RMCs to execute corresponding write operations asynchronously to one another. This is accomplished in part by providing a mechanism through which each RMC can eventually confirm that the write operations reflected to its peer were successfully received.

Referring further to FIG. 1, each RMC 60 operates generally by monitoring write operations to its respective buffer 50, and by reflecting (transmitting to the other RMC) those write operations that fall within a particular address range. Each such write operation in the preferred embodiment is generally in the form of a destination buffer address and a block of contiguous write data. The receiving RMC forwards the reflected write operation to the buffer interface of its own buffer 50 for execution (i.e., for storage of the write data at the specified destination buffer address), preferably after performing error checking as described below. Thus, each write operation that falls within a buffer's reflective memory area or "segment" is replicated, and is executed by both storage controllers 30. As a result, each storage controller maintains a mirrored copy of the other storage controller's buffer contents.

An important aspect of the design is that the storage controllers, and particularly the RMCs 60, execute the corresponding write operations asynchronously to one another (i.e., one storage controller may execute a given write operation before the other). Thus, when one storage controller (the "source") executes a write operation and reflects that operation to the other storage controller (the "target"), the source may continue processing subsequent write operations (and/or read operations) without waiting for the target to complete the reflected operation. As discussed below, the asynchronous reflective memory protocol implemented by the RMCs allows the source to determine whether the reflected operation is ultimately received successfully by the target, and to re-try the operation (or invoke an appropriate error correction routine) if it is not.

FIG. 2 depicts the buffer contents of two storage controllers 30 that are in a "bound" state. The arrows in this drawing represent buffer data that is being reflected to the other storage controller's buffer. For example, when a block of data is written to the reflective memory segment of storage controller A's buffer 50, it is also written to the buffer 50 of storage controller B at the same destination address. As illustrated, each storage controller thus stores within its own buffer a mirrored copy 70 of its peer's native or local buffer data 72, at the same buffer addresses as that peer. The address ranges used for storing local versus mirrored buffer data need not be contiguous, and are preferably defined using a set of configuration registers within each storage controller.

An important aspect of the reflective memory system, in the preferred embodiment, is that the memory reflection process, including the asynchronous reflective memory protocol, is fully automated within application-specific circuitry of the RMCs 60. (The term "automated," as used herein, refers generally to a task or function that is implemented without fetching and executing software or firmware instructions.) Specifically, during error-free operation, each RMC reflects buffer write operations to its peer RMC, receives and processes write operations reflected by that peer RMC, and implements associated error checking, acknowledgement and retransmission protocol tasks (as discussed below), without any CPU involvement or intervention.

Another important aspect of the reflective memory system, in the preferred embodiment, is that this protocol provides for error checking, acknowledgements and retransmissions, yet has sufficiently low overhead to be implemented over a pair of 10 Gb/s channels without limiting the rate at which the storage controllers receive traffic from the 10 Gb/s network 36. The design may, however, alternatively be implemented using higher speed reflective memory channels 62A, B and/or a greater number of such channels, in which case a less efficient reflective memory protocol may be used.

The RMCs 60 and the bi-directional reflective memory channel 62 advantageously support transfers and processing of reflected write operations at ten Gb/s in both directions. Because this transfer rate matches the maximum rate at which each storage controller 30 can receive data packets over the LAN 36, the reflective memory system does not limit the rate at which each storage controller can receive data into its respective buffer 50 from the network 36. This high rate at which the reflective memory system operates is attributable in-part to the use of a protocol that allows the storage controllers/RMCs to execute corresponding write operations asynchronously relative to each other, and is also attributable to the automation of key portions of this protocol.

Each RMC 60 can be enabled or disabled by firmware running on the respective storage controller 30. When disabled, an RMC does not reflect any buffer operations. An RMC may be placed in a disabled state when, for example, the storage controller is being used in a standalone or other non-redundant configuration. Each RMC can also preferably be placed in a special "rebind" mode in which the RMC reflects buffer read operations. As described below, the rebind mode may be used following a failover event to efficiently copy mirrored buffer data 70 from the buffer 50 of a surviving storage controller to the buffer 50 of a replacement storage controller.

As further depicted in FIG. 1, the storage controllers 30 also preferably include respective management processing units or "MPUs" 66 that communicate with each other over a separate, relatively low bandwidth channel 68. This channel 68 is preferably used to pass error status information and resolve error conditions. Because this channel 68 is separate from the bi-directional reflective memory channel, these communications between the MPUs do not interfere with transfers of reflected operations.

III. Mirroring of Buffer Metadata (FIG. 3)

Figure 3:
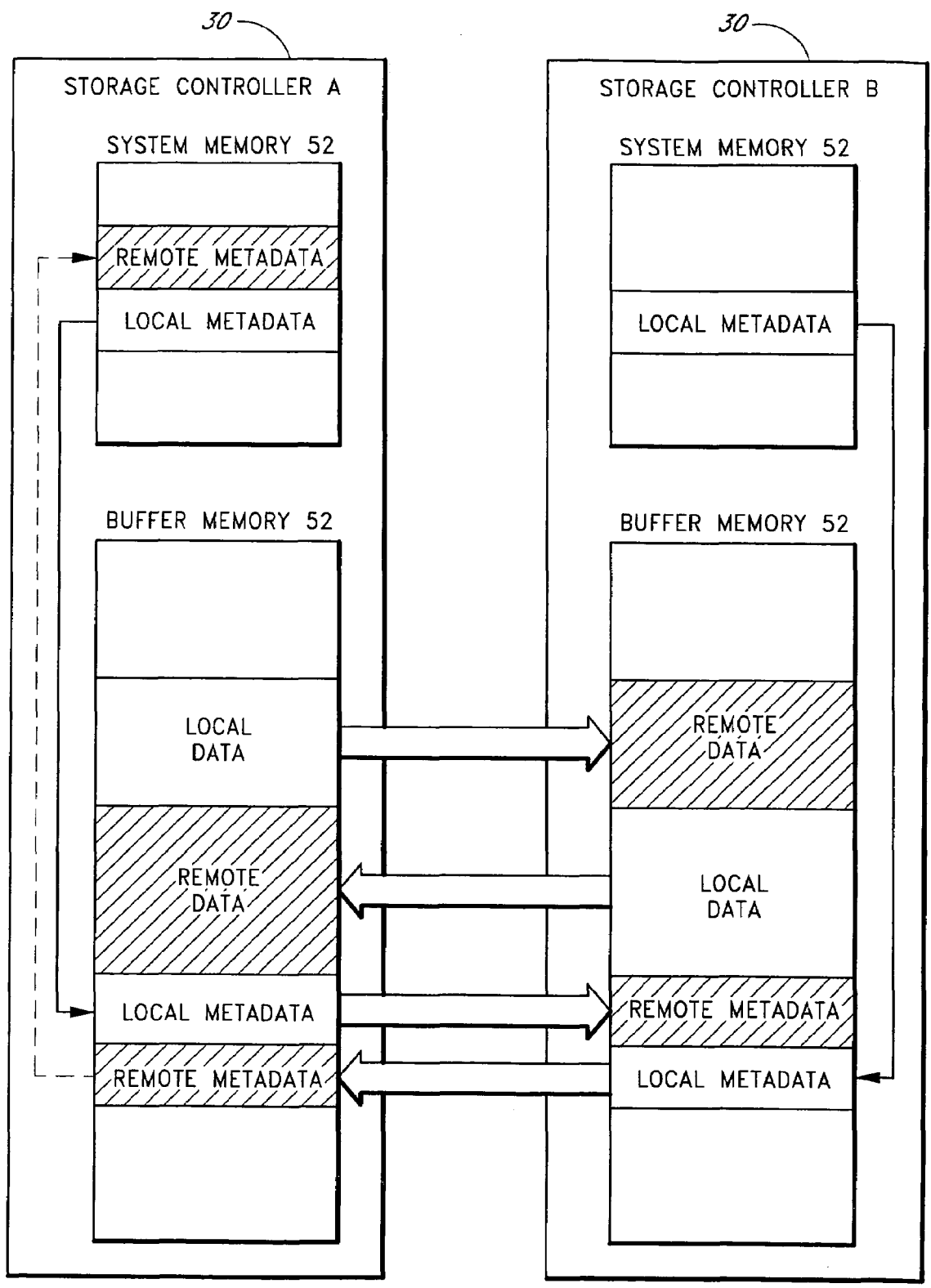
FIG. 3 illustrates a process by which buffer metadata is reflected bi-directionally between the storage controllers.

As depicted in FIG. 3, the bi-directional reflective memory channel 62 is also preferably used by each storage controller 30 to maintain a copy of its peer's buffer metadata. This is preferably accomplished by having each storage controller execute a firmware program that copies its buffer metadata from the system memory 52 to the reflective memory segment of its buffer memory 50 (or equivalently, by writing the same buffer metadata to both the system memory 52 and the buffer 50). This copying operation is depicted in FIG. 3 by the thin, solid arrows, while the reflected write operations are depicted by wide arrows. Typically, the buffer metadata will represent less than 1% of the reflected data.

In the event of a failover, the surviving storage controller may move the failing storage controller's buffer metadata from the buffer 50 to its system memory 52. This is depicted by the dashed arrow in FIG. 3 for storage controller A (the survivor). Once copied to the survivor's system memory, this metadata may be used by the survivor to interpret and process the failed storage controller's ordinary buffer data. In other implementations, the buffer metadata may alternatively be copied or moved between the paired storage controllers 30 over a separate communication channel.

The storage controllers 30 can optionally be configured, via firmware, to use the reflective memory channel to reflect other types of data. In this regard, the reflective memory channel 62 may be viewed as providing a general purpose memory reflection "service" that may be used by firmware for various types of inter-controller communication. In this regard, a portion of each buffer 50 may be allocated exclusively to general-purpose firmware transfers of data. Thus, although the reflective memory channel 62 is used in the preferred embodiment exclusively to transfer fast path data, slow path data, cache line headers, and rebind data (as described below), the underlying architecture is not so limited.

IV. Reflective Memory Controller (FIGS. 4 and 5)

Figure 4:
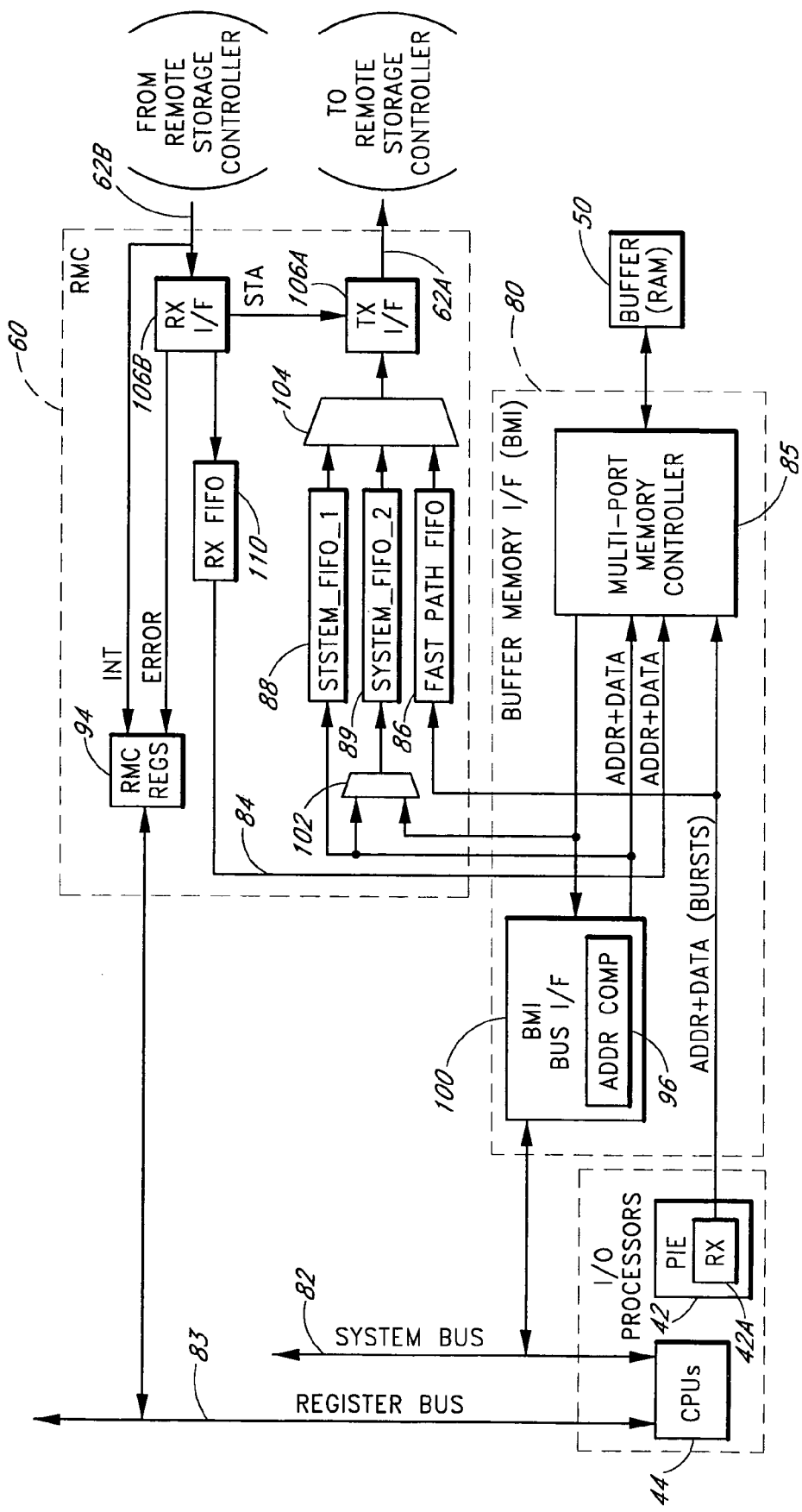
FIG. 4 illustrates the design of the storage controllers of FIG. 1, and particularly the reflective memory controllers thereof, in greater detail according to one embodiment.
Figure 5:
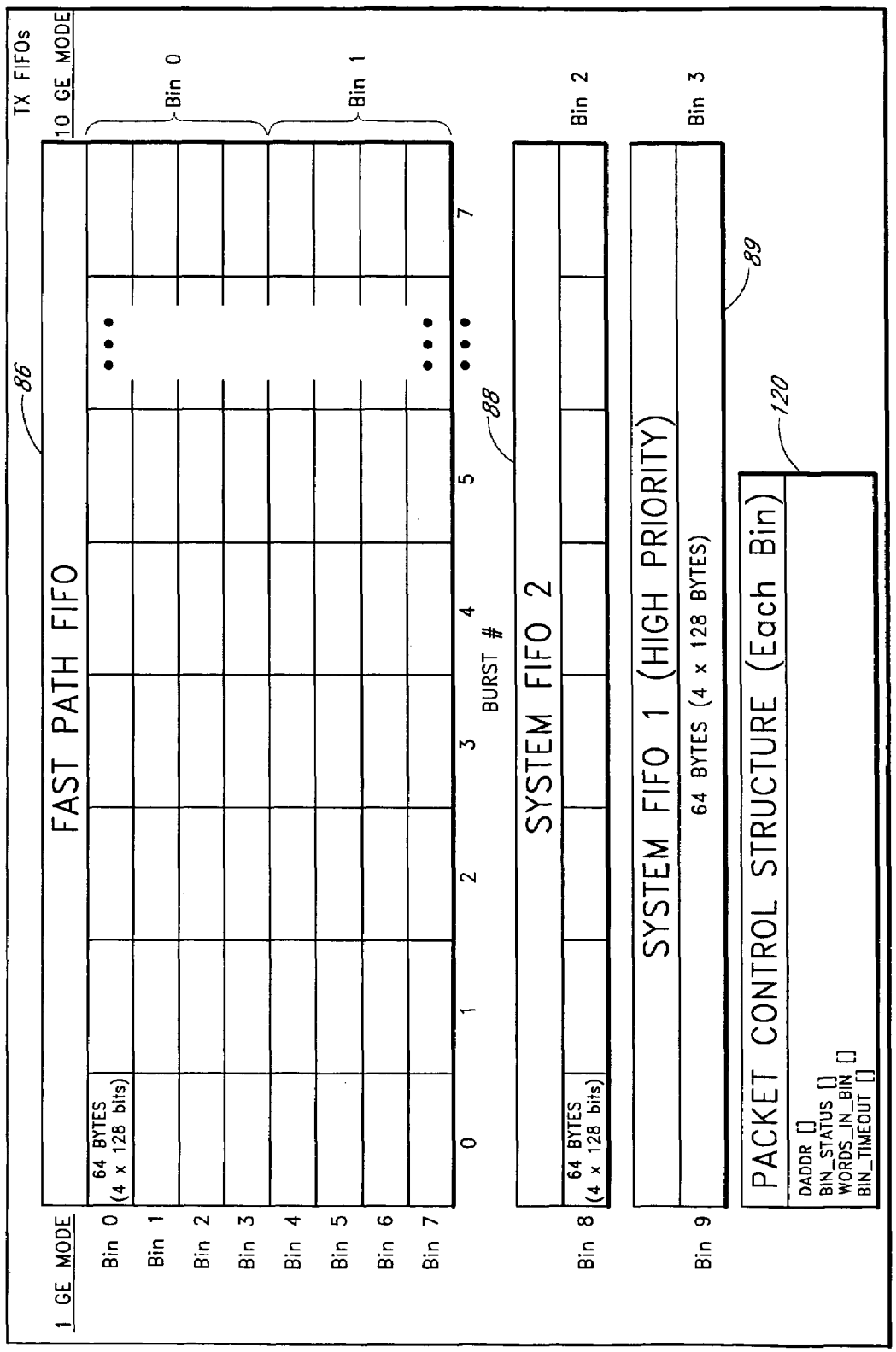
FIG. 5 illustrates the design of the fast path and system FIFOs (first-in-first-out buffers) of FIG. 4.

FIG. 4 illustrates the design of the RMCs 60 and related components according to one embodiment. As illustrated, each storage controller 30 includes a buffer memory interface (BMI) 80 that processes all traffic to and from its respective buffer 50. Incoming buffer data (in the form of write operations or bursts) enters the buffer memory interface 80 from two local sources: a receive (RX) circuit 42A of an automated protocol intercept engine (PIE) 42, and a system bus 82. The BMI 80 also receives buffer write data along a receive path 84, which carries data reflected from the remote storage controller. (The term "local" is used in the present description to refer to the storage controller illustrated in FIG. 4, and "remote" is used to refer to its peer.) Data received from each of these three sources is written to the buffer 50 by a multi-port memory controller 85. Incoming buffer write operations received from the system bus 82 first pass through the BMI's bus interface 100, which checks the addresses of such operations as described below.

Incoming buffer data from the PIE RX circuit 42A represents incoming network traffic (packet data) that is placed into the buffer 50 without any CPU intervention. This packet data, referred to as "fast path data," consists primarily of properly ordered, non-fragmented packet data received from the network 36. Out of sequence data received from the network 36, on the other hand, is processed by one or more CPUs of a cluster of CPUs 44 before being written to the buffer 50. This "slow path" data enters the BMI 80 via the system bus 82 after being properly re-sequenced by firmware.

The PIE RX circuit 42A processes the fast path data. This circuit, and a counterpart PIE TX circuit (not shown), automate selected portions of the iSCSI and TCP/IP protocols within application-specific circuitry, significantly reducing the quantity of protocol-level processing that needs to been performed by software/firmware. Details of a particular implementation of the protocol intercept engine 42, including the PIE RX circuit 42A, are set forth in a U.S. provisional patent application filed on Feb. 14, 2003 titled "High Availability Integrated Storage Network Processing For iSCSI Communication," the disclosure of which is hereby incorporated herein by reference. The PIE RX circuit is configured to write data only to the buffer's reflective memory segment, and not to other portions of the buffer 50. Thus, when the RMC is enabled, all incoming buffer write operations from the PIE RX circuit are reflected, regardless of the associated destination addresses. Because the PIE RX circuit strips off iSCSI and TCP/IP headers of incoming packets in the preferred embodiment, the packet data written to the buffer 50 consists essentially of packet payload data, without the associated headers.

As packet data from the network 36 is written to the buffer 50, firmware executed by one or more of the CPUs 44 generates corresponding cache line headers (CLHs) within the system memory 52 (FIG. 1). These CLHs describe the data currently stored in the local buffer 50, and are generated based on status signals from the PIE RX circuit 42A. To allow the remote storage controller 30 to interpret its mirrored copy of buffer data, the firmware also writes these CLH's to the reflective memory segment of the local buffer 50 (via the system bus 82), causing the CLHs to be copied to the remote storage controller's buffer 50. As described below, the hardware-implemented asynchronous reflective memory protocol gives priority to the CLHs over other types of reflected data, essentially ensuring that the necessary CLH data will be available to the surviving storage controller in the event of a failure.

As further depicted in FIG. 4, the RMC 60 preferably includes three transmission FIFOs (first-in-first-out buffers) that are used to accumulate data to be reflected to the other storage controller: a fast path FIFO 86 and two system FIFOs 88, 89. All fast path data to be reflected passes through the fast path FIFO 86. All other reflected data, including slow path data and CLH data, passes through one of the two system FIFOs 88, 89. As described below, the fast path and system FIFOs operate generally by accumulating buffer write data into packet bins for transmission across the reflective memory channel. The organization of the fast path and system FIFOs is depicted in FIG. 5 and is described separately below.

Two separate system FIFOs 88, 89 are provided in the illustrated embodiment in order to accommodate differing transmission priority levels for different data types. Specifically, the circuitry (described below) for transmitting data over the outgoing channel 62A gives priority to system_FIFO_1 over system_FIFO_2 (and also over the fast path FIFO 86). In one firmware configuration, the storage controller 30 uses system_FIFO_1 exclusively to transfer CLH data, and uses system_FIFO_2 to transfer slow path data and rebind data. The firmware may alternatively be written to use the system FIFOs to reflect additional or other types of data. Further, as will be recognized, a greater or lesser number of FIFOs may be used to buffer the outgoing data.

Operation of the system FIFOs 88, 89 is configurable by firmware via a set of address registers within a set of RMC registers 94 (FIG. 4). Specifically, each system FIFO may be assigned to a respective, mutually exclusive buffer address range or "window." An address comparison (ADDR COMP) circuit 96 within the BMI's bus interface 100 monitors the addresses of incoming buffer write operations received from the system bus 82 to determine whether such operations fall within either window. Write operations falling within window 1 are passed to system_FIFO_1, and write operations falling within window 2 are passed to system_FIFO_2. All other buffer write operations emanating from the system bus 82 are ignored by the RMC, and thus are not reflected.

As depicted in FIG. 4, a multiplexer 102 selects between two input sources to system_FIFO_2. The upper input to this multiplexer 102 is used to source system_FIFO_2 with buffer write data as such write data is passed from the BMI bus interface 100 to the multi-port memory controller 85. Data that enters system_FIFO_2 via this path consists of buffer write data emanating from the system bus 82 as the result of firmware operations.

The lower input to this multiplexer 102 is used to source system_FIFO_2 with data being read from the buffer 50. This path is used during rebind operations to copy the buffer data of a failed storage controller to the buffer 50 of a new, replacement storage controller. The multiplexer 102 selects this lower path when the RMC 60 is placed, via the RMC registers 94, into "rebind" mode via firmware executed by the CPUs 44. An important aspect of this feature is that it allows buffer data to be copied over from one storage controller to the other, over the reflective memory channel 62, without having to write any new data to the source buffer 50.

Specifically, to initiate a transfer of a block of buffer data from the buffer 50 of the source storage controller to the buffer 50 of a target storage controller, the firmware running on the source storage controller simply places the source's RMC in rebind mode, and then performs a sequence of "dummy" reads of this buffer data from its own buffer 50. Each block of data read from source's buffer 50 as the result of a dummy read operation is reflected across the reflective memory channel to the target's RMC, and is written to a corresponding address in the target's buffer 50. During this process of copying over the mirrored data, the surviving storage controller continues to provide network-based access to both its own disk drives 38 and the disk drives 38 of the failed storage controller 30.

Figure 8:
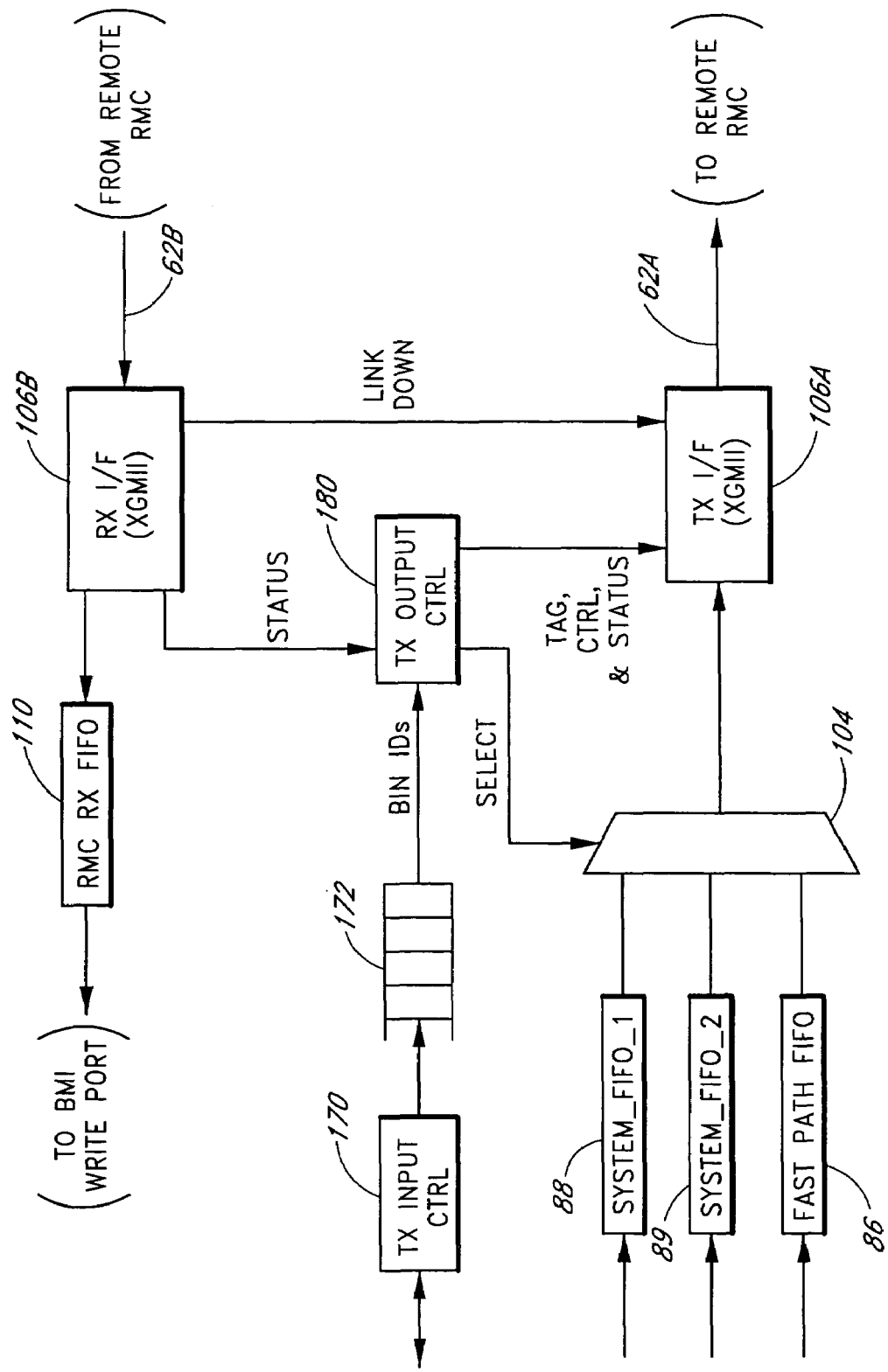
FIG. 8 illustrates components of the reflective memory controller of FIG. 4 in further detail.

With further reference to FIG. 4, a multiplexer 104 selects between the two system FIFOs 88, 89 and the fast path FIFO 86, and passes the output of the selected FIFO to a transmission interface (TX I/F) 106A for transmission across the outgoing channel 62A. The data is preferably sent across the channels 62A, 62B in packets according to an asynchronous reflective memory protocol which, as mentioned above, provides for error checking, packet acknowledgements, and packet retransmissions. As described below, when data from a transmission FIFO 86, 88, 89 is transmitted on the outgoing channel 62A within a packet, this data is maintained within that transmission FIFO until the packet has been acknowledged by the receiving RMC. The control logic and structures associated with the multiplexer 104 and the FIFOs 86, 88, 89 are depicted in FIG. 8 and are described separately below.

As further illustrated in FIG. 4, a receive interface (RX I/F) 106B receives the data transmitted by the remote storage controller on the incoming channel 62B. In operation, incoming packet data from the remote storage controller 30 is initially error-checked by the receive interface 106B, and when error free, is written to a receive FIFO 110. Data accumulated within this FIFO 110 is ultimately written to the buffer 50 by the multi-port memory controller 85. As depicted by the arrow labeled STA in FIG. 4, the receive interface 106B provides packet status information to the transmit interface 106A. As described below, the transmit interface 106A uses this information to send packet acknowledgement (ACK and NAK) messages to the remote storage controller via the outgoing channel 62A, allowing the transmitting controller 30 to re-send packets that are not successfully received. The ACKs and NAKs may be communicated between the RMCs using reserved control characters of the XGMII interface. The receive interface 106B also provides link status information to the transmit interface 106A indicative of the state of the incoming link 62B. A block diagram of the link control and error checking logic incorporated into the transmit and receive interfaces 62A, 62B is provided in FIG. 7 and is described below.

Errors detected by the receive interface 106B propagate to the RMC registers 94 via the lines labeled ERROR and INT in FIG. 4, respectively, allowing these events to be monitored by firmware executed by the CPUs 44. Firmware accesses the various RMC registers 94 using a register bus 83.

With the exception of the CPUs 44, all of the modules and components depicted in FIG. 4 are preferably implemented entirely within automated, application-specific circuitry (hardware state machines, etc.), allowing data reflection operations to occur at a high rate and with low latency.

In one implementation, the transmission and receive interfaces 106A, 106B, as well as the LAN interface 34 shown in FIG. 1, are all XGMII ten gigabit Ethernet interfaces. Other types of interfaces, including but not limited to SPI4 and Utopia 3, may alternatively be used. Further, as mentioned above, interfaces that exceed the transmission rate of the LAN interface 34 may be used to implement the reflective memory channel.

FIG. 5 illustrates the design of the transmission FIFOs 86, 88 and 89 in further detail. As illustrated, the RMC 60 arranges the fast path FIFO 86 into one of two possible configurations, depending upon whether the storage controller is operating in the 1 GE mode versus the 10 GE mode. When the storage controller is in the 1 GE mode (and is thus using from one to eight 1 GE LAN ports), the fast path FIFO is organized into eight 512-byte packet bins, as depicted by the labels BIN 0 through BIN 7 on the left side of the drawing. When operating in the 10 GE mode, the fast path FIFO is organized into two 2048-byte packet bins, as shown on the right side of the drawing.

Each of the system FIFOs is statically arranged as a single packet bin. Specifically, system_FIFO_2 is arranged as a single, 512-byte bin, and system_FIFO_1 (the higher priority system FIFO) is arranged as a single, 64-byte bin. Thus, when operating in the 1 GE mode, a total of ten bins (0-9) are provided, and when operating in the 10 GE mode, a total of 4 bins are provided (0-3). The 10 GE configuration advantageously allows the RMCs to sustain the streaming of jumbo packets of 9018 bytes (8960 bytes of data, 20 bytes TCP information, 20 bytes of IP information, and 18 bytes of Ethernet information).

Each bin of the transmit FIFOs 86, 88, 89 operates generally by accumulating continuous buffer write data for eventual transmission on the outgoing channel 62A within a single packet (i.e., each outgoing data packet contains payload data from a single bin). As described below, one important benefit of subdividing the reflected data into bins is that it reduces the amount of time needed to generate the CRC portion of each packet. When more than one bin is currently "ready" to be sent, the RMC selects between the ready bins so as to give highest priority to system_FIFO_1, intermediate priority to the fast path FIFO, and lowest priority to system_FIFO_2. The source storage controller 30 may therefore reflect buffer write operations across the channel 62A out-of-order (i.e., in an order that is different from the order in which the source controller 30 performs these operations).

As depicted at the bottom of FIG. 5, the TX FIFOs maintain one internal packet control structure 120 for each of the bins. Each such control structure 120 includes the following fields: DADDR[ ], which stores the destination address currently associated with the packet bin; BIN_STATUS[ ], which stores the bin's current status (Active, Free, Sent, or NAKed); WORDS_IN_BIN[ ], which keeps track of the number of words stored in the bin, and BIN_TIMEOUT[ ], which is used to implement a timeout counter.

In operation, the BMI 80 (FIG. 4) receives write traffic from the PIE RX circuit 42A and the system bus in 64-byte bursts, with each such burst being accompanied by a buffer destination address. Bursts emanating from the PIE RX circuit are processed as follows. When a burst is received, the beginning address of this burst is compared, in parrallel, to the DADDR fields of all currently active bins. If a match occurs (i.e. the address matches the next sequential write location from the contents of DADDR), the write data is stored in the corresponding active bin, and the bin's WORDS_IN_BIN field is updated with the new count value. The effect of this operation is to aggregate bursts for transmission to the remote RMC.

If there is no match, and a bin is available, the write data is stored in the next available bin, and the packet control structure fields of that bin are updated as follows: the bin's status is changed to Active, the beginning burst address is written to the DADDR field, and the WORDS_IN_BIN field is updated with the current number of words stored in the bin. If no bin is available (as may result if packet errors occur), the fast path FIFO asserts a "back off" signal (not shown) that causes the PIE RX circuit to slow down its operation.

As illustrated in FIG. 5, each bin of the fast path FIFO has a capacity of eight 64-byte bursts when in the 1 GE mode, and has a capacity of thirty two 64-byte bursts when in the 10 GE mode. The RMC sends the entire contents of the active bin across the outbound RMC channel 62A when either (1) the current burst is the last burst within a burst sequence of contiguous write data, or (2) the bin becomes full (512 bytes in 1GE mode, or 2048 bytes in 10GE mode). Upon sending the contents of the bin, the RMC updates the bin's status to "Sent," and activates the bin timeout counter. The bin's "Sent" status is maintained until the transmitting RMC receives a corresponding ACK or NAK message from the receiving RMC.

An important attribute of the asynchronous reflective memory protocol, in the preferred embodiment, is that the bins are selected without regard to LAN port number. Thus, when running in the 1 GE mode, all eight of the fast path bins are used even if less than all of the eight 1GE LAN ports used. The bandwidth associated with the fast path FIFO is thus effectively distributed among those 1 GE ports actually being used.

When a burst is received from the system bus 82 (FIG. 4), its destination address is checked to see if it falls within either system_FIFO_1's address range or system_FIFO_2's address range. If the burst falls within one of these address ranges, the corresponding system FIFO 88, 89 processes the burst in the same manner as described above for the fast path FIFO 86. Because system_FIFO_1 holds only a single 64 byte burst, it becomes ready for transmission each time it receives a burst from the system bus 82.

The receipt of an ACK message by the transmitting RMC indicates that the receiving RMC received the associated packet without detection of any errors. It does not, however, indicate successful completion of the write operation specified by the packet. If an error occurs when the receiving RMC performs this write operation, the receiving RMC will report this error to its own CPUs. This error will thereafter be reported to the transmitting storage controller 30 via the separate MPU channel 68.

IV-A. Packet Format and Protocol (FIGS. 6 and 7)

Figure 6:
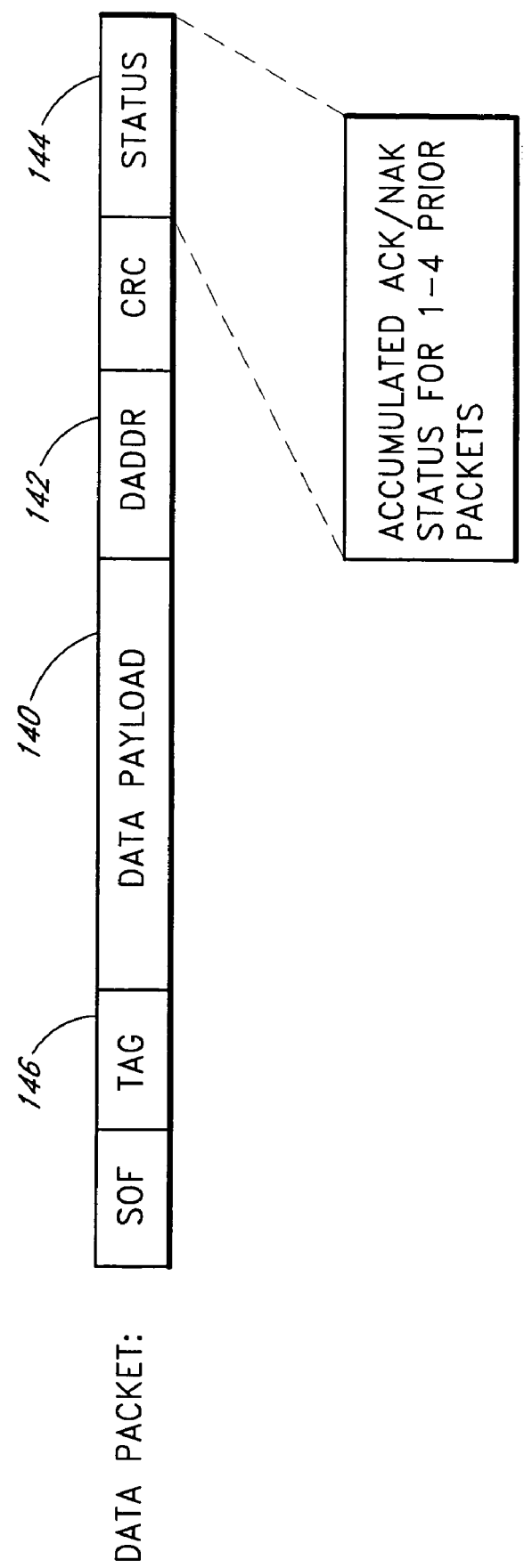
FIG. 6 illustrates the format of a data packet used to transfer data between the storage controllers.
Figure 7:
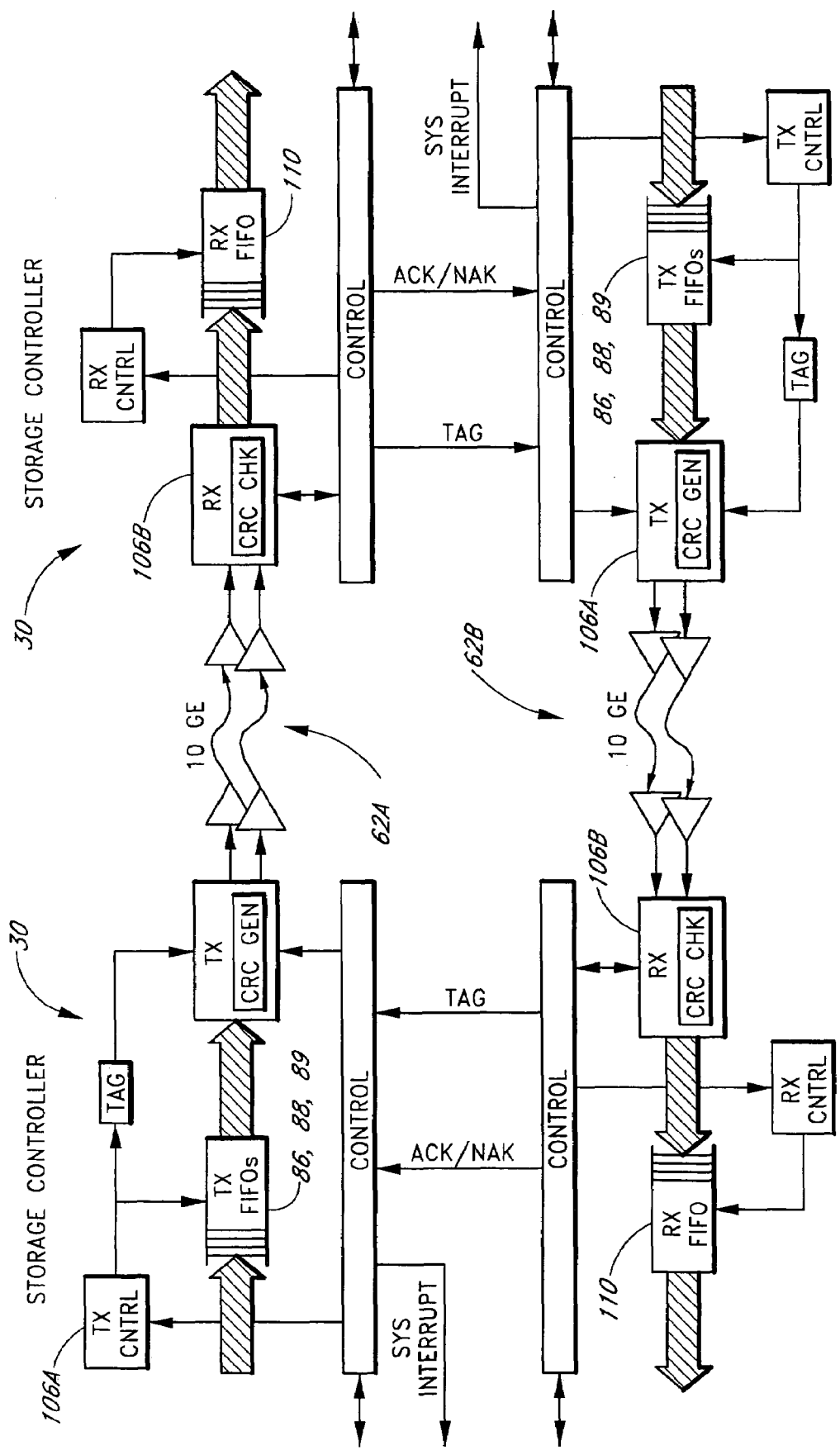
FIG. 7 illustrates the flow of data between and within a paired set of storage controllers according to one embodiment.

FIG. 6 illustrates the format of the data packets used to transmit bin contents across the channels 62A, 62B according to one embodiment of the asynchronous reflective memory protocol. The data payload portion 140 contains the contents of the bin currently being transmitted, and the destination address (DADDR) portion 142 contains the associated buffer destination address. The status word 144, if present, contains the ACK/NAK status of up to four packets that have been received by the transmitting RMC. Accumulated packet ACK/NAK messages are thus piggybacked on transmitted data packets. If no ACK/NAK messages are available to transmit, the status word is replaced with an end-of-frame (EOF) character. If a status word is ready to transmit but no data packets are being transmitted, the status word may be sent within a special status packet (not shown) that does not include the other fields shown in FIG. 6.

The TAG field 146 carries the bin ID of the bin being transmitted, and is used by the receiving RMC 60 to check for valid headers. The TAG field is protected from corruption by having the bin ID encoded using three control characters spread across three XGMII transmission lanes, with enough redundancy to sustain a one-lane failure.

The CRC (cyclic redundancy code) field is generated from all of the other fields within the packet except the TAG field 146. When a packet is received, the receiving RMC checks the packet's CRC, and incorporates the results of this CRC check (ACK or NAK) into the next status word 144 to be returned. The ACK or NAK is added to the status word according to the order of the packet's arrival (i.e., the ACK/NAK characters follow the packet arrival order).

Given that the entire packet is in question when a CRC error occurs, the TAG field is protected by having the bin ID encoded across the three transmission lanes as described above. The receiving RMC can thus reliably identify a failed packet transmission and return a corresponding NAK message.

Given the pipelined nature of packet protocol, any received data behind the failed bin transmission is also dropped in order to maintain write-order. The originating RMC keeps track of the bin IDs sent so that when a NAK is received, it can determine which bins need retransmission and which do not. If the re-transmited packet is successfully received, an ACK is sent back to the originator, which in turn frees-up the associated bin.

FIG. 7 illustrates the flow of data between and within the RMCs 60 of two paired storage controllers 30 in further detail. As depicted, the CRC portion of each packet is generated as the packet is being transmitted. A CRC-32 algorithm may be used for this purpose. Because each packet has a small payload (512 bytes or smaller when in 1 GE mode, and 2048 or smaller when in 10GE mode), the CRC portions can be generated rapidly, allowing data reflection at a high transfer rate and with low latency.

When the receive interface 106B of a storage controller receives a data packet, it checks the CRC. If the CRC is valid, the packet's data payload is pushed into the corresponding receive FIFO 110, and is eventually written to the receiving storage controller's buffer 50 at the destination address specified in the packet. If the CRC is determined to be bad, the received packet is dumped and a NAK status is generated. The NAKs and ACKs resulting from the CRC checks are queued by the corresponding transmit interface 106A for sending back to the originating RMC via a status word.

When the receive interface 106B receives a status word, it passes the status (ACK/NAK) information and associated tag(s) to the receiving RMC's transmit interface 106A. The transmit interface 106A in turn updates the associated packet control structures 120 (FIG. 5) to reflect the ACK/NAK status. If a particular bin receives an ACK, the bin is made available by setting its status to "Free."

If a bin receives a NAK, the transmit interface 106A checks bin's status to see if this is the first NAK, and if so, queues the bin for resending and updates status to "NAKed." If the NAKed bin is already in the NAKed state (indicating that the packet transmission has failed twice), the transmitting RMC enters into a "link down" state in which its transmission interface generates a system interrupt, stops transmitting data across the outbound RMC channel 62A, and starts sending XGMII Link Down Sequence Remote packets to the remote RMC. Although outgoing data reflection is halted, write operations to the buffer 50 of the interrupted storage controller preferably continue.

When a transmitting RMC receives a NAK from the receiving RMC, it stops transmitting data, and immediately starts sending a FLUSH character. The FLUSH character is sent as part of a status packet using a reserved XGMII control character. The receiving RMC drops/flushes all data received from the time the error was detected until the time the first FLUSH character is received. The transmitting RMC continues to send the FLUSH character until it is either (1) ready to retransmit the failed packet, or (2) is ready to send a status packet with an ACK or a NAK character. Data packet transmissions in the opposite direction may continue normally throughout this process.

IV-B. FIFO Control Circuits (FIG. 8)

FIG. 8 illustrates some of the additional control circuits associated with the RMC's transmit and receive interfaces 106A, 106B. The transmit input control circuit 170 (TX INPUT CTRL) is a bi-directional interface to the BMI 80 (FIG. 4). This circuit 170 is responsible for determining whether incoming write data should be added to an active bin versus placed in a new bin, and for determining whether a bin is ready to send. This circuit 170 is also responsible for slowing down the PIE RX circuit 42A when packet retransmission events occur so that transmission FIFO overruns are avoided.

As bins become ready for transmission, the transmit input control circuit 170 places the IDs of these bins in a transmit queue 172. This queue controls and keeps track of the order in which outgoing packets are transmitted. This transmission order information is used in the event of a NAK event to determine which of the transmitted packets need to be resent.

A transmit output control circuit 180 (TX OUTPUT CTRL) pulls bin IDs from the head of the queue 172, and based on each such ID, controls the multiplexer 104 to select between the three transmit FIFOs 86, 88, and 89. This circuit 180 also provides the tag IDs and transmission control information to the transmit interface 106A. In addition, as status characters (ACKs and NAKs) are received from the RMC's receive interface 106B, the transmit output control circuit 180 appends these status characters to outgoing data packets, or else sends them via separate status packets.

V. Error Handling

As described above, if the transmitting RMC receives two NAK messages for the same packet (meaning that a packet retransmission attempt has failed), it enters into a "link down" state. The transmitting RMC also enters into the link down state if a timeout event occurs, meaning that the corresponding timeout counter expired before receipt of an expected ACK or NAK message. Upon entering the link down state, the transmitting RMC generates a system interrupt and ceases to reflect data. Buffer write operations to the corresponding buffer 50 continue in this event.

In response to the system interrupt, firmware running on the interrupted storage controller initiates a "system pause" event. A system pause event may also be initiated by firmware in response to other types of error conditions, including conditions unrelated to the reflective memory channel. In response to the system pause event, the MPU (FIG. 1) of the interrupted storage controller 30 runs an error handling process that attempts to resolve the error condition through communications with the MPU of the peer storage controller. As described above, these communications occur over a separate channel, and thus do not rely on the existence of an operational reflective memory channel 62.

The MPUs may collectively determine that a failover event is necessary to resolve the error condition. This determination may alternatively be made by only one of the MPUs, particularly if the other MPU is not responding. In either case, one of the two storage controller's is designated as the survivor, meaning that it will provide network-based access to the volumes that were previously accessible via the other, failed storage controller.

What is claimed is:

1. A method of performing a rebind operation to copy a mirrored block of buffer data of a failed storage controller from a surviving storage controller to a replacement storage controller, wherein at least the surviving storage controller provides network-based access to a set of storage devices, the method comprising:

placing the surviving storage controller in a rebind mode in which, when a processor of the surviving storage controller reads data from a buffer of the surviving storage controller, a reflective memory controller of the surviving storage controller automatically transfers the data over a reflective memory channel to the replacement storage controller;

with the surviving storage controller operating in said rebind mode, performing the rebind operation in which said processor performs a sequence of read operations to read the mirrored block of buffer data from the buffer of the surviving storage controller, causing the reflective memory controller to automatically transfer the mirrored block of buffer data across the reflective memory channel to the replacement storage controller, wherein the processor performs the sequence of read operations via execution of firmware, and the reflective memory controller transfers the mirrored block of buffer data across the reflective memory channel via automated circuitry without executing firmware; and performing a write operation to the buffer of the surviving storage controller to cause the reflective memory controller to reflect the write operation across the reflective memory channel to the replacement storage controller;

wherein the method is performed without the surviving storage controller discontinuing network-based access to the set of storage devices.

2. The method of claim 1, wherein the method is performed while the surviving storage controller is providing network-based access to both a first set of storage devices owned by the surviving storage controller and a second set of storage devices owned by the failed storage controller.

3. The method of claim 1, wherein the method enables the mirrored block of buffer data to be copied to the replacement storage controller without having to both read the mirrored block of buffer data from, and write the mirrored block of buffer data back to, the buffer of the surviving storage controller.

4. The method of claim 1, wherein the method is performed without re-writing the mirrored block of buffer data to the buffer of the surviving storage controller.

5. The method of claim 1, wherein the sequence of read operations is performed solely to copy the mirrored block of buffer data to the replacement storage controller.

6. The method of claim 1, wherein the method comprises transferring the mirrored block of buffer data across the reflective memory channel using a packet-based protocol that provides for packet error checking and acknowledgements.

7. The method of claim 1, further comprising transmitting buffer metadata across the reflective memory channel from the surviving storage controller to the replacement storage controller, said buffer metadata being descriptive of data stored in the buffer of the surviving storage controller.

8. The method of claim 7, wherein the method comprises giving higher priority to the buffer metadata than to the mirrored block of buffer data for purposes of transmission across the reflective memory channel.

* * * * *